Feb. 2, 1960 G. W. HALFORD 2,923,229
CHARCOAL BROILER
Filed June 13, 1958 4 Sheets-Sheet 1

INVENTOR.
GEORGE W. HALFORD

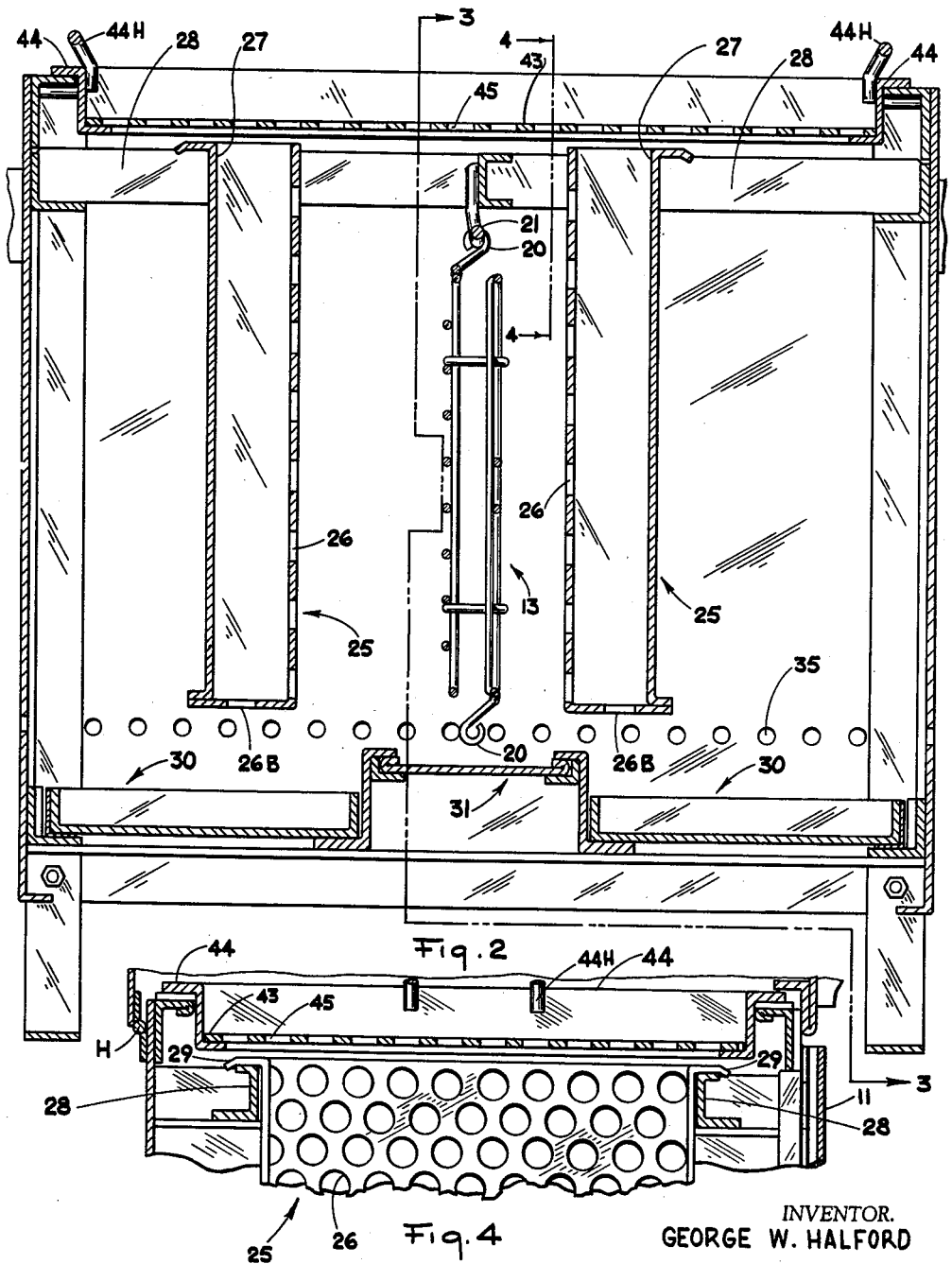

Feb. 2, 1960 G. W. HALFORD 2,923,229
CHARCOAL BROILER
Filed June 13, 1958 4 Sheets-Sheet 4
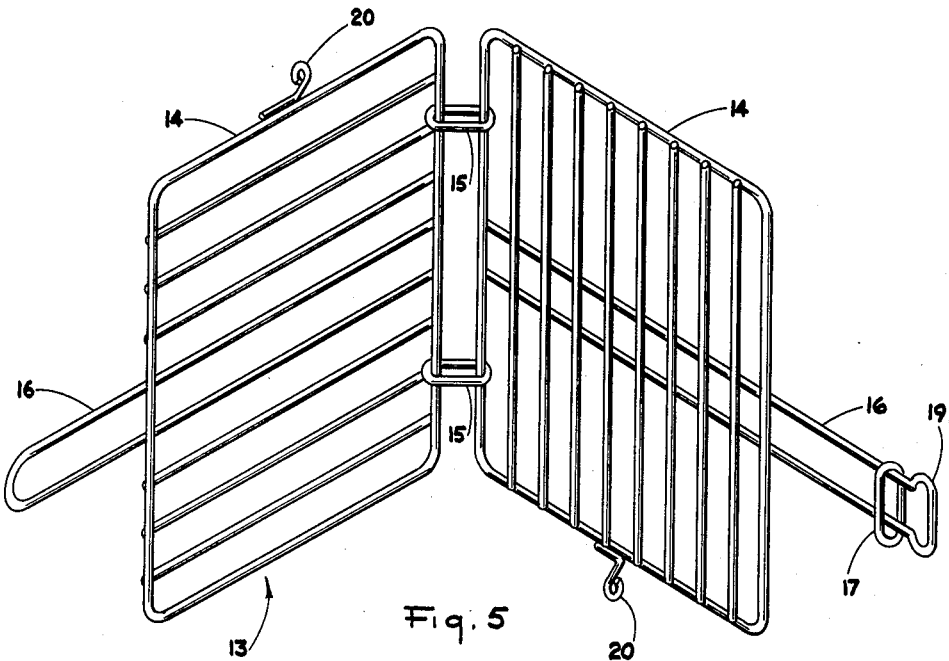
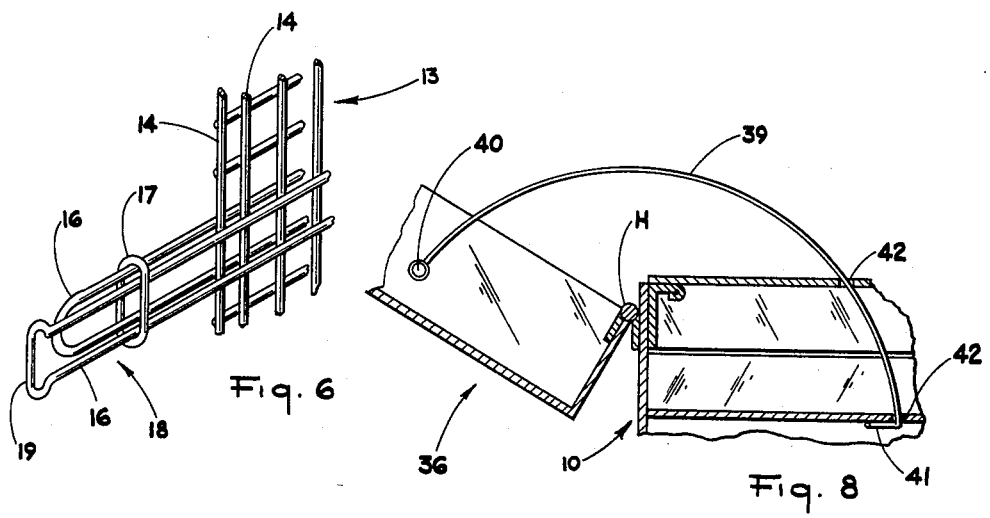
INVENTOR.
GEORGE W. HALFORD

2,923,229

CHARCOAL BROILER

George W. Halford, Van Nuys, Calif., assignor of one-tenth to Gadget-of-the-Month Club, Inc., Los Angeles, Calif., a corporation of California Application June 13, 1958, Serial No. 741,955

1 Claim. (Cl. 99—339)

Generally speaking, the present invention relates to the cooking art and, more particularly, relates to an improved charcoal broiler including among its several major improvements the provision of a broiler cabinet having a broiler chamber therein and having, in one preferred form, two apertured fuel-carrying container means transversely adjustably movably positioned within and on each side of said broiler chamber for adjustment toward and away from the center of the broiler chamber and the region therein wherein a food object to be broiled is adapted to be positioned, thus providing very effective means for controllably varying the application of radiant heat to the food object (usually meat, such as a steak or the like, which is to be broiled. Furthermore, one preferred form of the present invention includes apertured food object carrying means, usually adapted to carry a meat food object, such as a steak or the like, although not so limited, removably positioned within said broiler chamber and having handle means removably extending from a position within said broiler chamber through handle aperture means to a position exterior of the broiler cabinet, whereby said handle means will remain sufficiently cool to be manually grasped during a broiling operation of the food object supported by said carrying means within the broiler chamber. It should also be noted that one preferred form of the present invention includes drawer means positioned under each of the apertured fuel container means and accessible from the exterior of the cabinet. Also, one preferred form of the invention includes air access control aperture means positioned in the bottom of the cabinet immediately below the broiler chamber for controlling the access of air to the fuel-carrying container means whereby the supply of oxygen may be controllably reduced to a value such as to effectively reduce the combustion rate of the charcoal or the like carried in the fuel-carrying container means to make it possible to effectively bank the fires therein whereby to produce a great deal of radiant heat without completely consuming the fuel during any given cooking operation, whereby the fuel can be extinguished after a given cooking operation for subsequent use during one or more later cooking operations. Furthermore, one preferred form of the present invention may include a controllably openable cover and underlying apertured grill plate defining a baking chamber positioned above said broiler chamber and above said fuel-carrying container means.

With the above points in mind, it is an object of the present invention to provide an improved charcoal broiler including means for conveniently shifting fuel-carrying containers toward and away from a food object, such as a steak or the like, which is to be broiled within a broiling chamber.

It is a further object of the present invention to provide an improved charcoal broiler of the type set forth in the preceding object which includes transverse track means extending across the broiler chamber and carrying track-engaging means attached to fuel-carrying container means to provide an arrangement allowing transverse shifting of said fuel-carrying container means toward and away from the broiling region in the broiling chamber.

It is a further object of the present invention to provide an improved charcoal broiler of the type set forth in the preceding object including air access control aperture means positioned in the bottom of the cabinet below the broiler chamber for controlling the access of air to the fuel-carrying container means whereby the rate of combustion can be controlled at will.

It is a further object of the present invention to provide convenient drawer means positioned beneath the apertured fuel-carrying container means.

It is a further object of the present invention to provide a baking chamber defined immediately above said broiler chamber and said fuel-carrying container means by a controllably openable cover and an underlying apertured grill plate.

It is a further object of the present invention to provide, in an improved charcoal broiler of the type set forth in the preceding object, a food object carrying means removably positionable within the broiler chamber and having a handle removably extending to a position exterior of said broiler chamber.

Other and allied objects will be apparent to those skilled in the art after a careful study of the accompanying illustrations, the present specification, and the appended claim.

To facilitate understanding, reference will be made to the hereinbelow-described drawings, in which:

Fig. 1 is a perspective view of one illustrative embodiment of the present invention with the door of the broiler cabinet open to provide access to the broiler chamber, with the air access control aperture means or panel at the bottom of the broiler cabinet partly pulled out, with the left drawer means partly pulled out, with the controllably openable cover in fully open position, and also with the apertured grill plate normally lying under the cover partly broken away at the right end for clarity;

Fig. 2 is a vertical sectional view of the device shown in Fig. 1 with the cover removed, with the food object carrying means illustrated in Figs. 5 and 6 inserted in broiling position within the broiler chamber, with the drawer means and air access control aperture means and front doors of Fig. 1 all closed—said section being taken along the plane indicated by the arrows 2—2 in Fig. 3;

Fig. 4 is a fragmentary view, partly in vertical section and partly in elevation, taken in the direction of the arrows 4—4 in Fig. 2;

Fig. 5 is a perspective view illustrating one specific embodiment of the apertured food object carrying means adapted to position a steak or the like within the broiler chamber for broiling same while positioning the handle means thereof exterior of the broiler cabinet—this view showing said means in open position prior to the reception of a steak therein;

Fig. 6 is a fragmentary view of a portion of the carrying means of Fig. 5 showing the handle adapted to be positioned exterior of the cabinet and the means locking same in closed position;

Figures 1, 7:
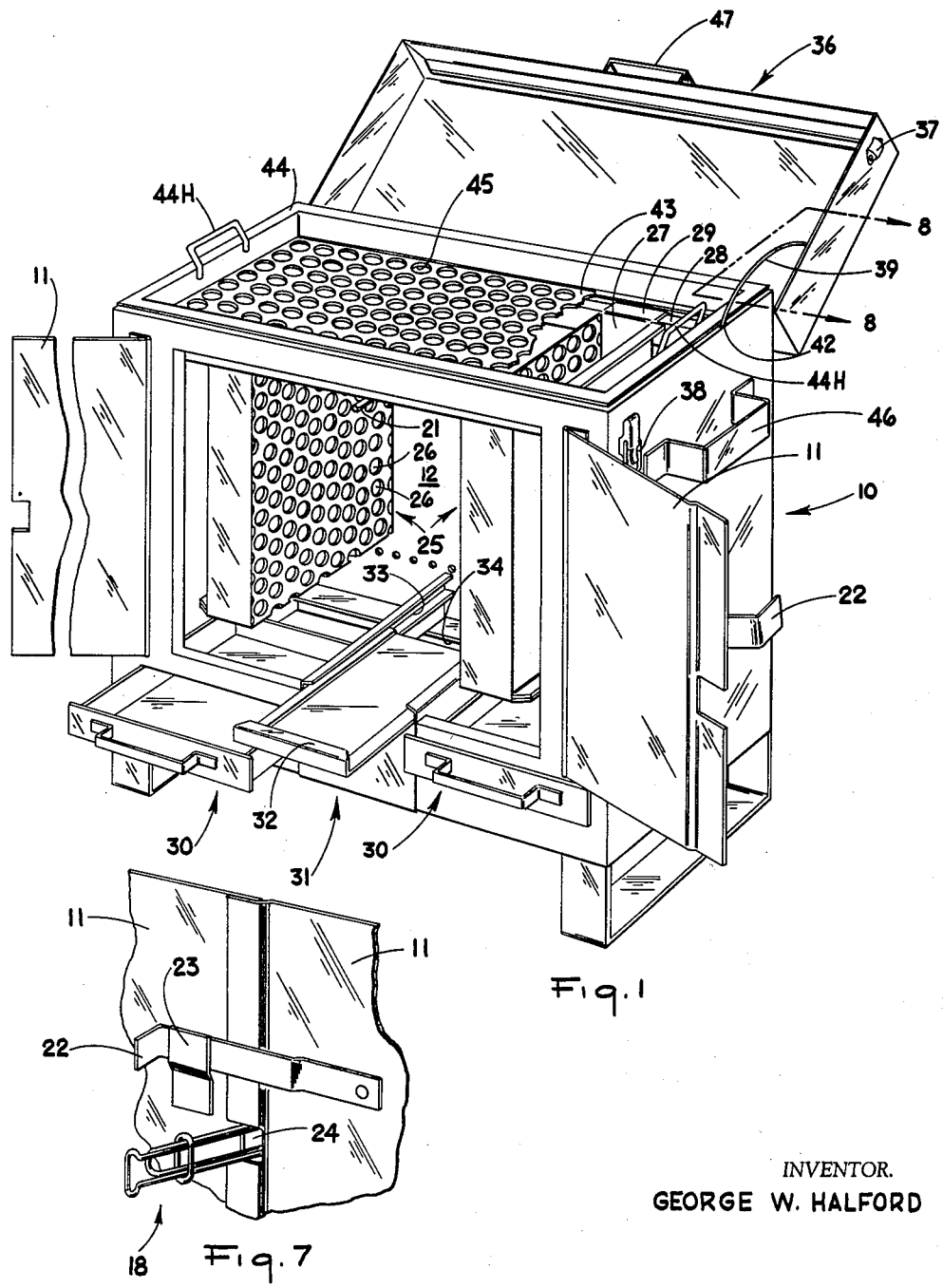
Figure 3:
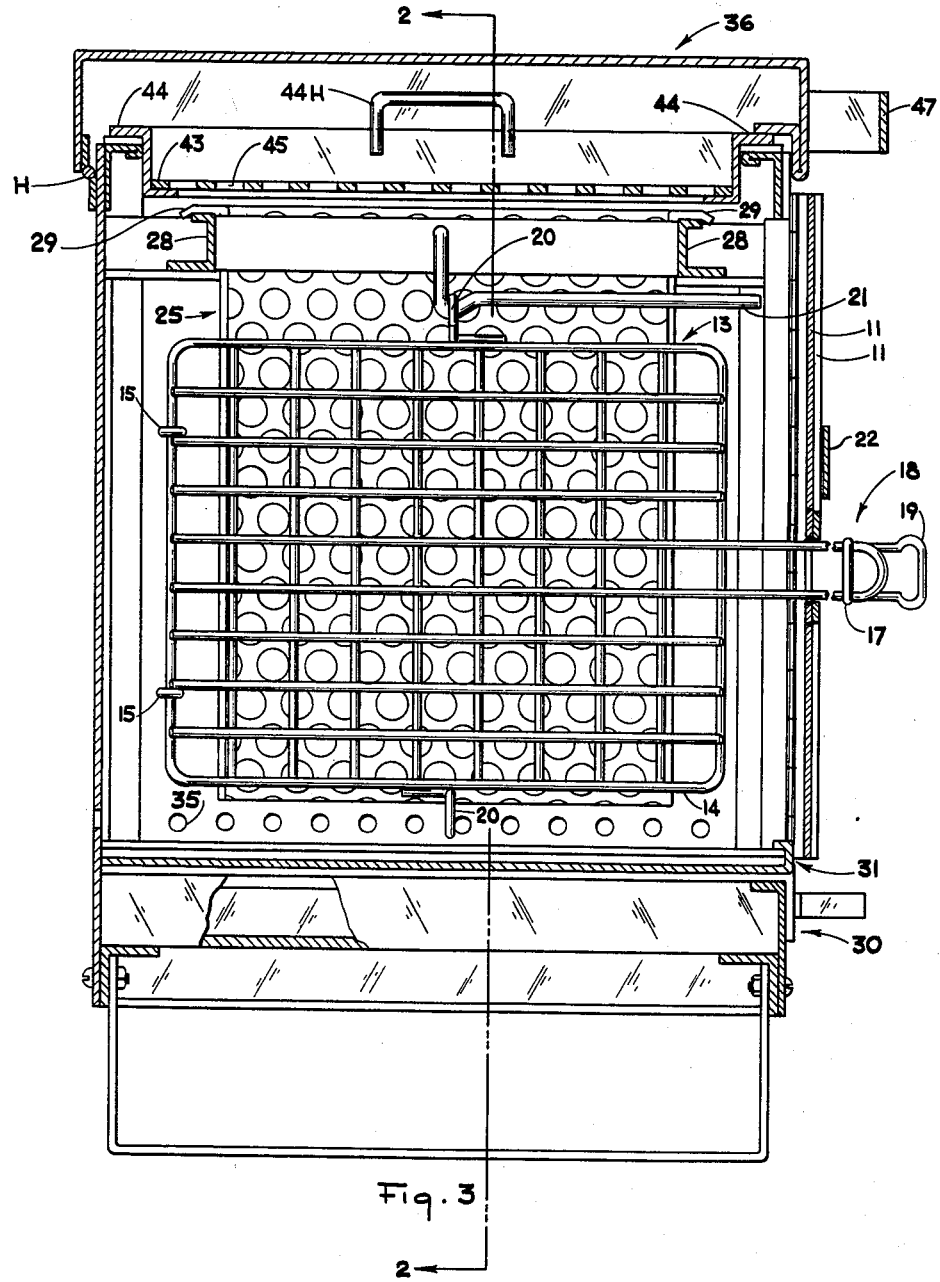
Fig. 3 is a vertical sectional view of the device in fully closed position as it would appear taken along a plane such as is indicated by the arrows 3—3 in Fig. 2 except for a small portion which is broken away adjacent the bottom of Fig. 3 to show the far drawer in elevation.

Fig. 7 is a fragmentary perspective view of the closed doors of the broiler chamber showing the locking means therefor and showing the closed handle means of the food object carrying means extending through an aperture into a position exterior of the cabinet; and Fig. 8 is a fragmentary perspective view taken in the direction of the arrows 8—8 in Fig. 1 and shows the hinged mounting and the arcuate retainer adapted to mount and limit arcuate movement of the cover.

The charcoal broiler of the present invention includes a broiler cabinet, such as is indicated generally at 10, preferably made of heat-resistant material, such as metal or the like, although not so limited, provided with access door means, such as the doors indicated at 11, and defining a broiler chamber, such as indicated at 12, therein.

The present invention also includes apertured food object carrying means adapted to be removably positioned within the broiler chamber and adapted to removably carry a food object which is to be broiled. In the specific example illustrated, as best seen in Figs. 2, 3, 5, and 6, said apertured food object carrying means is indicated generally at 13 and comprises two grid-like plates 14, which are pivotally connected together at their rear edges by two pivotal connection rings 15. Each of the grid-like plates 14 has a handle portion 16 connected thereto and extending forwardly therefrom, with the handle portion 16 of the right grid-like plate 14 shown in Fig. 5 being longer than the left handle portion 16 whereby, when the two grid-like plates 14 are closed with respect to each other into the closely spaced relationship shown in Figs. 2 and 6, the two handle portions 16 may be conveniently locked together by slide locking ring 17—it being understood that a steak or other food object to be broiled is adapted to be positioned between the plates 14 before this locking operation is performed. It should also be noted that the outer end of the longer handle portion 16 of the complete handle means indicated generally at 18 is provided with an enlarged portion 19 adapted to retain the locking ring 17 thereon against accidental removal therefrom. It should be noted that the upper edge of the left grid-like plate 14, as shown in Fig. 5, is provided with an engaging eye member 20, while the lower edge of the right grid-like plate 14 is provided with a similar eye-engaging member 20, making it possible to mount the entire food object carrying means 13 within the broiler chamber 12 by slidably engaging either eye 20 on a forwardly projecting rod 21 mounted within the broiler chamber 12 adjacent the top thereof. Thus, it will be seen that a steak or the like which is to be broiled can be conveniently mounted within the broiler chamber in the general manner best seen in Fig. 3, and the front doors 11 of the broiler cabinet can be closed and locked by the lock bar 22 and retainer 23, with the handle means 18 of the food object carrying means 13 projecting through the apertures 24 in the superimposed edges of the front doors 11 of the broiler cabinet 10. This will allow the food object or steak positioned within the broiler chamber 12 to be cooked while the exterior handle 18 will remain sufficiently cool to allow the cook to grasp same for removing the entire food object carrying means 13 whenever desired.

The present invention also includes apertured fuel-carrying container means transversely adjustably movably positioned within the broiler chamber on at least one side of the central broiling region thereof. In the specific example illustrated, there are two such fuel-carrying container means indicated generally at 25 and each consisting of a hollow container having a plurality of apertures, such as indicated at 26, on the inner surface thereof facing the central broiling region of the broiling chamber 12. Each of the fuel-carrying container means is open at the top, as indicated at 27, whereby it can be conveniently loaded with lumps of charcoal or other suitable solid fuel (not shown) too large to pass through the apertures 26 on the inner surfaces of the fuel-carrying containers 25 or to drop through the similar apertures 26B at the bottoms thereof.

Each of the fuel-carrying container means 25 is provided with track-engaging means adapted to engage transverse track means extending across the broiler chamber whereby either of said fuel-carrying container means can be transversely adjusted toward or away from the broiling region of the broiling chamber. In the specific example illustrated, said transverse track means comprising two transversely directed track members 28 extending transversely across the top of the broiler cabinet and inside thereof from one end to the other thereof and fixedly mounted thereto. Also, in the specific example illustrated, the track engaging means of each of the apertured fuel-carrying container means 25 takes the form of forwardly and rearwardly directed lips 29 at the top of each fuel-carrying container 25, which slidably rest upon the tops of the transverse track members 28 whereby to allow each of the fuel-carrying container means 25 to be transversely shifted toward and away from the center of the broiler chamber 12. This allows the degree of radiant heat applied to a steak carried by the food object carrying means 13 to be controllably adjusted.

The present invention also includes air access control aperture means positioned in the bottom of the cabinet immediately below the broiler chamber for controlling the access of air to the fuel-carrying container means. In the specific example illustrated, this takes the form of a slidable panel indicated generally at 31 having a manually graspable lip or handle 32 whereby the panel 31 may be slidably pulled forwardly as indicated in Fig. 1 with respect to the grooved structure 33 carrying same so as to provide an opening such as indicated at 34 in the bottom of the broiler chamber 10, or whereby said panel 31 may be rearwardy moved into the completely closed position best seen in Fig. 3 effectively closing the air access hole 34 and controlling the combustion rate since the only other access openings into the broiler chamber comprise the plurality of small holes 35 in the walls of the broiler chamber 10. This means that the burning of the fuel in the containers 25 may be damped to a considerable degree to provide effective radiant heat and yet to make it possible to extinguish the burning charcoal at the end of a cooking operation by applying an extinguishing agent to the charcoal, and to make it possible to subsequently re-ignite the charcoal for one or more later cooking operations through the use of an igniting agent such as a petroleum product, alcohol, or the like.

The present invention also includes drawer means, such as are indicated at 30, slidably positioned with respect to the lower portions of the cabinet 10 beneath each of the fuel-carrying container means 25 and removable from the front of the cabinet 10. It should be noted that, under some circumstances, the drawer means 30 may be used to supplement the air access control aperture means described in the preceding paragraph and that, additionally, in the event that the solid fuel carried by the container means 25 is of a type which will produce a measurable residue of ashes, the drawer means 30 may act as ash-removing drawer means for removing ashes fed under the action of gravity through the bottom apertures 26B of the fuel container means 25 into either of the open drawers 30. Of course, this would only occur after the fuel in the containers 25 had been burned sufficiently to produce some ashes.

The present invention also includes a controllably openable cover and underlying apertured grill plate defining a baking chamber positioned above the broiler chamber and above the fuel-carrying container means. In the specific example illustrated, said controllably openable cover is indicated generally at 36 and is hinged by hinge means H with respect to the back wall of the broiler chamber 10. The cover 36 is provided with a handle and with fastener portions 37 at each end thereof adapted to be engaged by fastener loops 38 for locking the lid 36 in the closed relationship best seen in Fig. 3, when desired. The arcuate movement of the cover 36 is limited by the arcuate member 39 best seen in Fig. 8, which is fastened as indicated at 40 to one side edge of the cover 36 and which has its opposite end provided with a retaining portion 41 positioned below the lowest one of arcuately aligned apertures 42 provided near the top of the broiler chamber 10 adjacent the right edge thereof as viewed in Fig. 1.

It should be noted that a removable apertured grill plate 43 is removably mounted within the rectangular opening defined by the top edge of the broiler chamber 10 by means of an edge flange 44, which is provided with removing handles 44H, and is provided with a plurality of apertures 45 whereby heat rising from the broiler chamber 12 and fuel-carrying containers 25 positioned therebelow may readily pass, by convection, through the apertures 45 into the baking chamber defined between the apertured grill plate 43 and the cover 36, thus providing a place where corn or various other food objects may be effectively baked or maintained in heated condition until use.

It should be noted that the end walls of the broiler chamber 10 are provided with similar carrying handles such as indicated at 46.

Numerous modifications and variations of the present invention will occur to those skilled in the art after a careful study hereof. All such, properly within the basic spirit and scope of the present invention are intended to be included and comprehended herein as fully as if specifically described, illustrated and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claim only, with due consideration for the doctrine of equivalents.

I claim:

A broiler comprising: a broiler cabinet of heat-resistant material provided with controllably openable and closable front access door means and defining a normally closed broiler chamber therein; meat object carrying means consisting of opposed wire grid members controllably fastenable together to removably carry therebetween a meat object which is to be broiled; mounting means consisting of an overhead mounting hook open at the front and positioned in said broiler chamber and removably mounting said meat object carrying means within said broiler chamber; two apertured substantially rectangular solid-fuel-carrying container means, each provided with a substantially horizontal track-engaging hanger means at the top thereof; and two spaced parallel transverse tracks extending across said broiler chamber at the top thereof and removably carrying each of said track-engaging means of each of said fuel containers and positioning said fuel containers therebelow within and on each side of said broiler chamber and on each side of said meat object carrying means for transverse adjustment toward and away from each other; said access door means being provided with handle aperture means therethrough, and said meat object carrying means having handle means removably extending from a position within said broiler chamber through said handle aperture means into a position exterior of said broiler cabinet; controllably openable and closable air access control aperture means positioned in the bottom of said broiler cabinet immediately below said broiler chamber for controlling the upward inflow of air into the closed broiler chamber to the fuel-carrying container means during initial ignition and burning of soild fuel carried by said fuel-carrying container means and controllably closable to any desired degree after said burning solid fuel has been converted into a glowing red hot bed of coals, whereby to confine heat radiated therefrom to the interior of said closed broiler chamber and in the region of said meat object carrying means positioned between each of said fuel-carrying container means; ash-removing drawer means positioned under said fuel-carrying container means and controllably accessible and removable from the front of said broiler cabinet for removing ashes fed under the action of gravity from said fuel-carrying container means into said drawer means; and a controllably openable cover and a vertically spacedly underlying horizontally apertured grill plate defining a substantially rectangular horizontally directed baking chamber positioned directly over said broiler chamber and above each of said fuel-carrying container means.

References Cited in the file of this patent

UNITED STATES PATENTS

| | | |
|---|---|---|
| 716,366 | Bayno | Dec. 23, 1902 |
| 1,656,181 | Elbert | Jan. 17, 1928 |
| 1,997,192 | Kasamir | Apr. 9, 1935 |
| 2,069,824 | Engel et al. | Feb. 9, 1937 |
| 2,314,772 | Corra | Mar. 23, 1943 |
| 2,441,190 | Fuller | May 11, 1948 |
| 2,626,559 | Rau | Jan. 27, 1953 |
| 2,680,436 | Derden | June 8, 1954 |
| 2,734,499 | Lombardi | Feb. 14, 1956 |
| 2,821,187 | Tescula | Jan. 28, 1958 |